(12) United States Patent
Hirschman et al.

(10) Patent No.: US 8,600,020 B2
(45) Date of Patent: Dec. 3, 2013

(54) SYSTEM AND METHOD FOR FACILITATING A TELEPHONY CARRIER TO MAKE TRANSACTIONS

(75) Inventors: Edward Hirschman, Princeton, NJ (US); Avanish Pande, Marlboro, NJ (US)

(73) Assignee: ITXC IP Holdings S.à r.l., Luxembourg (LU)

( * ) Notice: Subject to any disclaimer, the term of this patent is extended or adjusted under 35 U.S.C. 154(b) by 1346 days.

(21) Appl. No.: 10/881,759

(22) Filed: Jun. 30, 2004

(65) Prior Publication Data

US 2006/0002533 A1 Jan. 5, 2006

(51) Int. Cl.
*H04M 15/00* (2006.01)

(52) U.S. Cl.
USPC ............. 379/114.02; 379/114.06; 379/114.12

(58) Field of Classification Search
USPC ............. 379/112.01, 112.07, 114.01, 114.02, 379/114.06, 114.12, 219, 220.01, 221.01, 379/221.02
See application file for complete search history.

(56) References Cited

U.S. PATENT DOCUMENTS

| | | | | |
|---|---|---|---|---|
| 6,442,258 | B1 * | 8/2002 | Mashinsky | 379/114.02 |
| 6,487,283 | B2 * | 11/2002 | Thomas et al. | 379/112.01 |
| 7,050,555 | B2 * | 5/2006 | Zargham et al. | 379/115.01 |
| 7,162,542 | B2 * | 1/2007 | Abjanic et al. | 379/221.01 |
| 7,236,575 | B2 * | 6/2007 | Kim et al. | 379/114.07 |
| 2002/0069152 | A1 * | 6/2002 | B.C et al. | 705/37 |
| 2002/0133446 | A1 * | 9/2002 | Lee | 705/36 |

* cited by examiner

*Primary Examiner* — Ahmad Matar
*Assistant Examiner* — Nafiz E Hoque
(74) *Attorney, Agent, or Firm* — Kaplan Breyer Schwarz & Ottesen, LLP

(57) ABSTRACT

In a system and method for facilitating an telephony carrier to make transactions with carrier customers and/or carrier suppliers, one or more parameters are monitored and the telephony carrier is automatically to be triggered to send an offer to at least one of the carriers when at least of the parameters reaches a predetermined threshold. Preferably, the parameters are related to telephone capacity handled by the telephony carrier, and the offer is an offer to buy capacity from existing or new carrier suppliers or an offer to sell capacity to carrier customers. Thus, the efficiency of transactions is substantially increased.

26 Claims, 3 Drawing Sheets

SYSTEM AND METHOD FOR FACILITATING A TELEPHONY CARRIER TO MAKE TRANSACTIONS

FIELD OF THE INVENTION

The present invention relates to telephony techniques, and in particular, relates to a system and method for facilitating an Internet telephony service broker to make transactions between and among telephony carriers.

BACKGROUND OF THE INVENTION

As shown in FIG. 1A, telephone calls, especially long distance calls, often involve more than one telephony carriers 110, 111, 112, 113 to complete the calls over PSTN network between an originating telephone 22 and a terminating telephone 25. Therefore, transactions are often made between an originating carrier 110 and a terminating carrier 111, or between the originating/terminating carriers 110, 111 and one or more bridging carriers 112, 113 that bridge between the originating and terminating carriers 110, 111.

With the development in Internet telephony technologies, more and more telephone calls are transmitted, at least in part, over the Internet so as to substantially lower cost. As shown in FIG. 11B, a typical phone-to-phone call, which was traditionally transmitted completely over a PSTN network, is now able to be transmitted partly over the Internet. More specifically, a call initiated from a telephone 22 is transmitted over a PSTN network 11 to an originating gateway 202, which converts the call from PSTN protocol to a packet data network protocol and transmits the call over packet data network 10 (such as the Internet) to a terminating gateway 302 where the call is converted back to a PSTN protocol and transmitted to the destination telephone 25 through a PSTN network 12. This saves cost as the gateways 202 and 302 are local to their respect telephones 22, 25, especially when the call between the two telephones 22, 25 is a long distance call or even an international call.

Originating gateway 202 and terminating gateway 302 are often if not usually owned by different carriers, and transactions have to be made between the two carriers for completing the call. In the sense of the transaction for a specific call, the owner of the originating gateway 202 is called here an "originating carrier", and the owner of the terminating gateway 302 is called here a "terminating carrier". It is understood that an originating carrier may be a terminating carrier, or vise versa, in other calls. In addition to terminating gateway 302, there may exist plural of other gateways that are also capable of conveying calls to (and from) the destination telephone 25 over the PSTN network 12. Moreover, there are numerous gateways that are capable of transmitting calls to other destinations (e.g., telephone 26) over other local PSTN network (e.g., PSTN 13), and the carrier that owns the originating gateway 202 may not have any transaction agreement with them or even be aware of them. Transactions of capacities are often made directly between the originating carriers and the terminating carriers.

Alternatively, to facilitate the transactions between originating carriers and terminating carriers, a telephony system 100 may be provided to broker the capacities. More specifically, the telephony system buys capacities from carrier suppliers (e.g., the owners of terminating gateways 301-304) and sell them to the originating carriers (e.g., the owner of originating carrier 202), wherein the originating and terminating carriers do not need to directly make agreements with each other, and even do not need to know each other. When a call destined to the telephone 25 is initiated at telephone 22, if the originating carrier of gateway 202 is used, the call is transmitted through PSTN network 11 to the originating gateway 202. The originating gateway 202 sends a request to the telephony system 100 for a terminating gateway to forward the call. The telephony system 100 checks a database 101 and selects a terminating gateway 301 that is capable of completing the call to the destination telephone 25. The IP address of such gateway 301 is forwarded to the originating gateway 202, for completion of the call. With the address of the terminating gateway 301, the originating gateway 202 forwards the call to the terminating gateway 301, which conveys the call to the destination telephone 25. Often, the addresses of plural terminating gateways may be forwarded to originating gateway 202, with the originating gateway 202 trying them in a prescribed order. Additionally, the communication over the Internet between the gateways may include further call related information, such as a transaction ID for each call, billing information, etc.

The originating carrier who buys call completion services either from the telephony system 100 or directly from the terminating carrier is called a "buyer" or a "carrier customer", while the terminating carrier who sells the capacity to the telephony system 100 or directly to the originating carrier is called a "seller" or a "carrier supplier". Thus, for each call, the transactions are made between the telephony system 100 and both the carrier customer (who owns the originating gateway) and the carrier supplier (who owns the terminating gateway), or made directly between the carrier customer and the carrier supplier.

The transactions are, however, often changed. Such changes may result from a change of the offered rates from a carrier supplier, a change in capacity demand from the carrier customers, leaving of a key carrier supplier, etc. For example, when there is a surge of demand from carrier customers to a specific destination, the carrier customers or the telephony system 100 needs to buy more capacity from the carrier suppliers that capable of handling calls to that specific destination. When a key supplier leaves or has increased its rate, the customer carrier or the telephony system 100 may need to seek capacity from new carrier suppliers. This often involves reprogramming systems manually, or other inefficient means. Therefore, there exists a need of efficiently making transactions in such systems with less human intervention and increased efficiency.

SUMMARY OF THE INVENTION

To solve the above problem, the present invention discloses a system and method for facilitating a telephony carrier to make transactions with carrier customers and/or carrier suppliers. In particular, as taught by the present invention, one or more parameters are monitored and the telephony carrier is automatically to be triggered to send an offer to at least one of the carriers when at least one of the parameters reaches a predetermined threshold. Preferably, the parameters are related to telephone capacity handled by the telephony carrier, and the offer is an offer to buy capacity from existing or new carrier suppliers or an offer to sell capacity to carrier customers. Thus, efficiency is increased.

Preferably, the telephony carrier is an originating carrier or a terminating carrier. Alternatively, the telephony carrier is a telephony system that brokers the capacities between the carrier customers and the carrier suppliers.

BRIEF EXPLANATION OF THE DRAWINGS

The above and other features and advantages of the present invention will become clearer after reading the following detailed description of preferred embodiments of the present invention with reference to the accompanying drawings in which.

DETAILED DESCRIPTION OF THE PREFERRED EMBODIMENTS

Figure 1A:
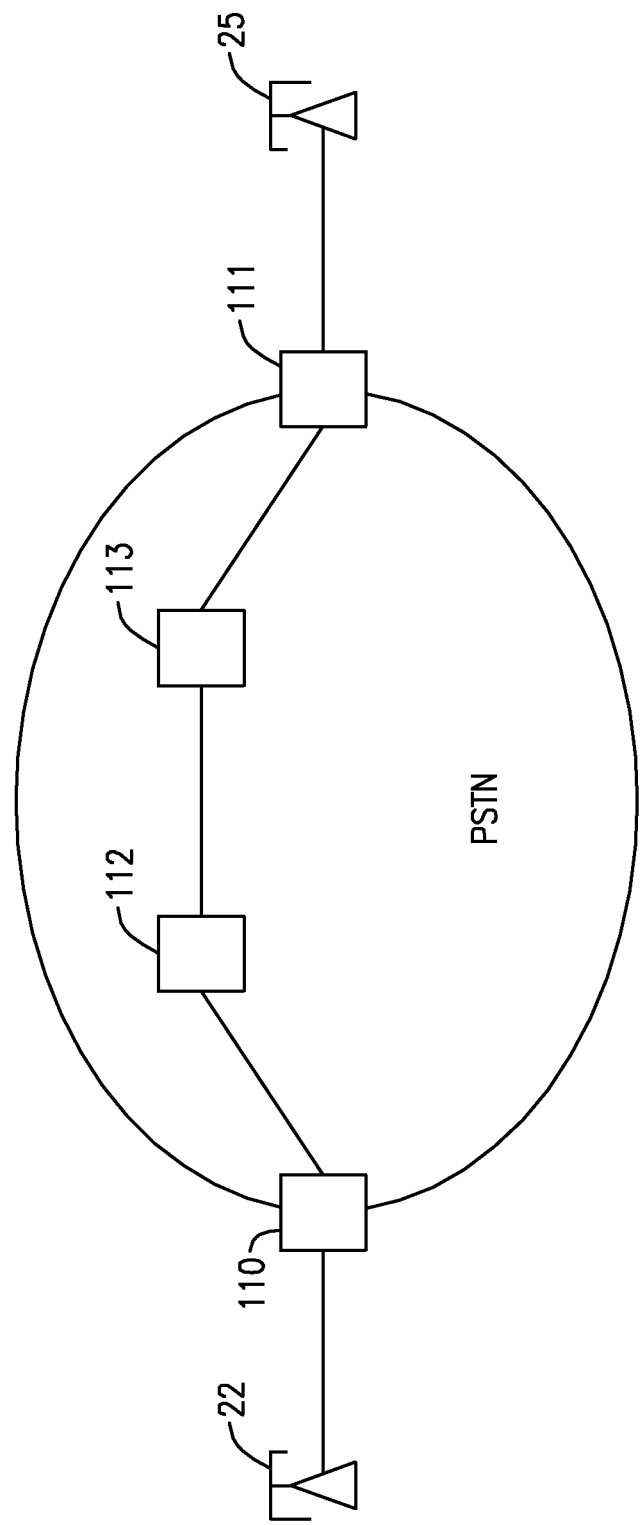
FIG. 1A is an illustration of a conventional telephony network over PSTN of the prior art.
Figure 1B:
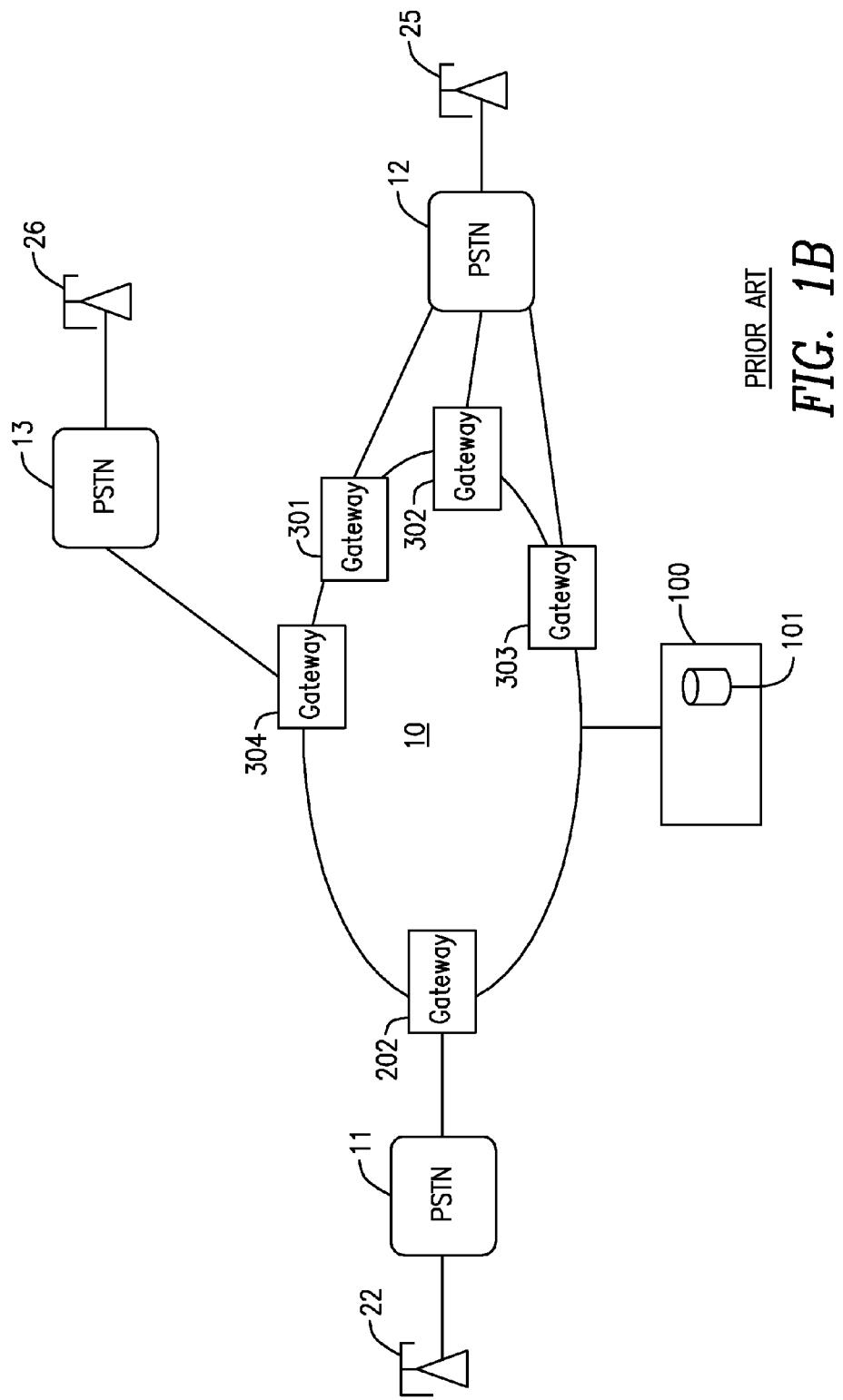
FIG. 1B is an illustration of a telephony network involving Internet of the prior art.
Figure 2:
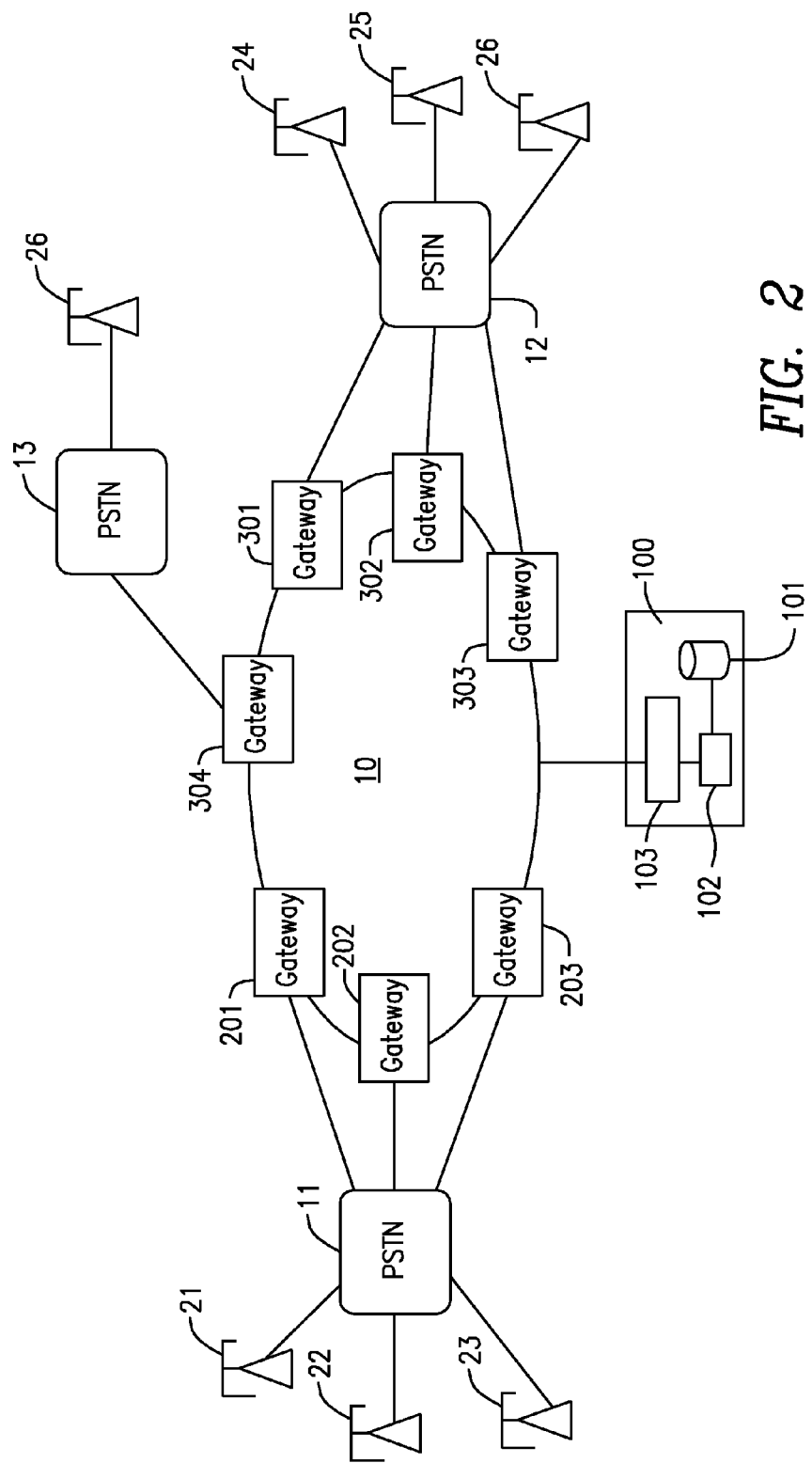
FIG. 2 is an illustration of a preferred embodiment of the telephony system according to the present invention.

As shown in FIG. 2, which is similar to FIG. 1, a telephony system 100 makes transactions with plural carriers, each being represented by a gateway 201-203 and 301-303 that it owns. Gateways 201, 202, 203 are all capable of receiving, through PSTN 1, calls initiated by telephones 21, 22, 23 and conveying such calls to a packet data network, e.g., Internet 10. Gateways 301, 302, 303 are all capable of conveying calls from the Internet to a destination telephone such as 24, 25, or 26 through PSTN 12. Gateway 304 is capable of conveying calls to and from exemplary telephone 26 though PSTN 13. It is understood that each gateway can work as both an originating gateway and a terminating gateway, depending upon whether the call is initiated or terminated through the gateway. Though there are only seven gateways shown in the FIG. 2, it is understood that there can be many gateways arranged to interface between various portions of the PSTN and the data network.

The telephony system 100 comprises a database which stores all the information about the gateways 201-203 and 301-304, such as their IP address, associated PSTN extensions, rates, codes, etc, as well as information concerning the transactions made with each gateway.

The carriers that sell to the telephony system 100 are herein called "carrier suppliers" or "sellers", and the carriers that buy capacity from the telephony system 100 are called "carrier customers" or "buyers". It is understood that a carrier can be both a supplier and a customer of the telephony system 100. More specifically, for a specific call, when the gateway of a carrier works as an originating gateway, such a carrier is a customer or buyer from the point of view of that particular transaction with the telephony system 100. When the gateway of a carrier works as a terminating gateway for a specific call, the carrier is a supplier or seller from the point of view of the particular transaction with the telephony system 100.

According to the present invention, the telephony system 100 further comprises monitoring means 102, which automatically detects one or more parameters in the database 101, and a trigger 103 which automatically triggers the telephony system 100 to take an action when one or more of the parameters are determined to have reached a predetermined threshold.

Preferably, the parameters are related to telephony capacity that is handled by the telephony system 100, and the triggered action is sending an offer to one or more of the carrier customers and/or carrier suppliers.

Preferably, the parameters comprise a demand change in capacity from one or more carrier customers, and the offer is an offer to buy more capacity from carrier suppliers. For example, if a surge of the from the gateways 202 to the PSTN network 12, which may represent a specific city or location, is detected, the telephony system 100 is automatically triggered to send out an offer to buy more capacity from an existing carrier supplier 302 or even buy capacity from new carrier suppliers 301 and/or 302 which are also capable of handling calls to PSTN 12. The offer may be previously prepared and stored in the database, or may be generated by the trigger 103 when the surge in demand is detected.

If a key carrier supplier (e.g., gateway 302) is detected to be unavailable or slows down or stops its supply of traffic, for example, when supply loss from the gateway 302 is detected by reduction in traffic carried by gateway 302, the telephony system 100 is automatically to be triggered to send an offer to buy capacity from new carrier suppliers 301 and 303 to maintain the required capacity.

Alternatively, if the rate of the key carrier supplier (e.g., gateway 302) is detected to be raised, the telephony system 100 is automatically triggered to send offers to new carrier suppliers 301, 303 to buy capacity so as to replace the key carrier supplier, i.e., gateway 302, at a more reasonable price.

Alternatively, when the demand from the carrier customer (e.g., gateway 202) is detected to have dropped, or when the telephony system 100 has purchased more capacity from a key carrier supplier (usually at a lower price), the telephony system 100 is automatically triggered to send an offer to an existing carrier customer 202 to sell more capacity. Alternatively, the offer may be also sent to new originating gateways 201, 203 to sell capacity.

More generally, when a margin or difference between the demand from carrier customers and the capacity bought from carrier suppliers is detected to have reached a threshold, the telephony system 100 is automatically triggered to send offers either to buy more capacity from carrier suppliers or to sell more capacity to carrier customers. Alternatively, if it is detected that rates or other parameters have not changed within a specified period of time, the telephony system 100 is automatically triggered to send an offer to potential carrier suppliers to buy capacity at a lower price. In still another embodiment, if the price targets from carrier customers are detected to be falling faster than costs offered from the carrier suppliers, the telephony system 100 can also be automatically triggered to send an offer to new carrier suppliers for lower priced services.

The present invention can also work to automatically send various notices when a specific parameter or event is detected. For example, if the credit of a carrier customer is detected to be at or nearing its credit limit, the telephony system 100 is automatically triggered to send a credit notice to the carrier customer seeking payment Alternatively, when the rates and/or codes are manually or automatically changed, a notice of such a change in rate and/or code is automatically triggered to be sent out the carrier customers and/or suppliers.

Although the above has explained in detail with the brokering telephony system 100 in an Internet telephony environment as the preferred embodiment of the present invention, it shall be understood that the present invention is not limited to the Internet telephony environment, or to the telephony system 100 that brokers capacities between carrier customers and carrier suppliers.

For example, the telephony system 100 can be implemented as an originating carrier or a terminating carrier, or as a part of the originating or terminating carrier. The telephone calls may be completely transmitted over PSTN network without going through Internet. Therefore, it shall be appreciated numerous changes are possible to a skilled person in the art without departing the gist of the present invention, and the scope of the present invention is solely intended to be defined in the accompanying claims.

What is claimed is:

1. A method for managing telephony traffic over a data network, the method comprising:

determining by a computer processor of a telephony system whether price targets from telephony carrier customers in said data network are falling faster than costs offered by an initial telephony carrier supplier in said data network; and sending, by the telephony system, an offer to buy services from one or more new telephony carrier suppliers in said data network if price targets from the telephony carrier customers are determined to be falling faster than costs offered by the initial telephony carrier.

2. The method of claim 1 further comprising monitoring, with the telephony system, parameters related to telephony capacity of said telephony traffic handled by said initial telephony carrier supplier.

3. The method of claim 2 further comprising sending an offer to purchase capacity with the telephony system.

4. The method of claim 2 wherein said parameters comprise an increase in demand of telephony traffic capacity from said telephony carrier customers.

5. The method of claim 4 further comprising sending, with the telephony system, an offer to said initial carrier supplier when a surge in said demand is detected.

6. The method of claim 5 wherein said demand is reflected by call attempts.

7. The method of claim 5 wherein said demand is reflected by hour and utilization metrics.

8. The method of claim 2 wherein said offer comprises a bid by said telephony system for telephony traffic capacity from the one or more new carrier suppliers.

9. The method of claim 8 wherein said parameters comprise an indication of whether an existing key carrier supplier is leaving and/or unavailable.

10. The method of claim 9 wherein said indication is reflected by a loss in telephony traffic supply to destinations serviced by said existing key carrier supplier.

11. The method of claim 10 wherein said loss is detected by reduction in ASR and said telephony traffic carried by said existing key carrier supplier.

12. The method of claim 8 wherein said parameters comprise an indication of whether an existing key carrier supplier has raised its rate.

13. The method of claim 8 wherein said parameters comprise an indication of whether rates have not been lowered in a given time period.

14. The method of claim 8 wherein said parameters comprise an indication of whether price targets from one or more carrier customers and/or from competing suppliers are falling faster than a given supplier's costs.

15. The method of claim 2 wherein said offer comprises an offer to sell more capacity to existing carrier customers or to sell capacity to new carrier customers.

16. The method of claim 15 wherein said parameters comprise a decrease in demand of capacity from one or more said existing carrier customers.

17. The method of claim 16 wherein said offer is triggered when a decrease in said demand is detected.

18. The method of claim 15 wherein said parameters comprise an increase in capacity that said telephony carrier has acquired from a key carrier supplier.

19. The method of claim 1 further comprising monitoring, with the telephony system, remaining credit of each carrier customer.

20. The method of 19 wherein said offer comprises a credit notice to said carrier customers.

21. The method of claim 1 further comprising monitoring, with the telephony system, an indication of whether codes within a given pricing breakout have been redefined.

22. The method of claim 21 wherein said offer comprises a code change notice.

23. The method of claim 1 further comprising monitoring, with the telephony system, an indication of whether rates in a given pricing breakout have been changed.

24. The method of claim 23 wherein said offer comprises a rate change notice.

25. The method of claim 1 further comprising monitoring with the telephony system the price targets from the telephony carrier customers in the data network and the costs offered by the initial telephony carrier supplier in the data network prior to determining whether price targets from the telephony carrier customers in the data network are falling faster than the costs offered by the initial telephony carrier supplier.

26. A system for managing telephony traffic over a data network, the system comprising:

a telephony system including a computer processor executing instructions for:

determining whether price targets from carrier customers in the data network are falling faster than costs offered by an initial carrier supplier in the data network; and sending an offer to buy services from one or more new telephony carrier suppliers in said data network if price targets from the telephony carrier customers are determined to be falling faster than costs offered by the initial telephony carrier.

* * * * *